(12) United States Patent
Lee et al.

(10) Patent No.: US 12,134,423 B2
(45) Date of Patent: Nov. 5, 2024

(54) FRONT VEHICLE BODY STRUCTURE

(71) Applicants: Hyundai Motor Company, Seoul (KR); Kia Corporation, Seoul (KR)

(72) Inventors: Jung-Deok Lee, Hwaseong-si (KR); Mun Soo Cha, Suwon-si (KR); Seongwook Seo, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 288 days.

(21) Appl. No.: 17/846,510

(22) Filed: Jun. 22, 2022

(65) Prior Publication Data

US 2023/0182817 A1    Jun. 15, 2023

(30) Foreign Application Priority Data

Dec. 15, 2021   (KR) .................. 10-2021-0179712

(51) Int. Cl.
  *B62D 21/15*   (2006.01)
  *B62D 25/08*   (2006.01)
  *B62D 25/20*   (2006.01)

(52) U.S. Cl.
  CPC ........... *B62D 21/152* (2013.01); *B62D 25/08* (2013.01); *B62D 25/2045* (2013.01)

(58) Field of Classification Search
  CPC ...... B62D 21/15; B62D 21/152; B62D 25/08; B62D 25/082; B62D 25/2045
  See application file for complete search history.

(56) References Cited

U.S. PATENT DOCUMENTS

| | | | |
|---|---|---|---|
| 4,917,435 A * | 4/1990 | Bonnett | B62D 29/043 296/190.08 |
| 2013/0088048 A1* | 4/2013 | Ichikawa | B62D 25/08 296/203.02 |
| 2014/0300135 A1* | 10/2014 | Roehrl | B62D 25/082 156/60 |
| 2016/0236714 A1* | 8/2016 | Tatsuwaki | B62D 25/2045 |
| 2018/0065676 A1* | 3/2018 | Yoshida | B62D 25/20 |
| 2019/0283810 A1* | 9/2019 | Nothdurfter | B62D 23/00 |
| 2020/0047810 A1* | 2/2020 | Ayukawa | B21C 23/002 |
| 2020/0247477 A1* | 8/2020 | Lee | B62D 25/14 |
| 2021/0316793 A1* | 10/2021 | Chung | B62D 25/025 |
| 2021/0371014 A1* | 12/2021 | Leier | B62D 25/085 |
| 2023/0182817 A1* | 6/2023 | Lee | B62D 25/08 296/203.02 |
| 2024/0059232 A1* | 2/2024 | Park | B62D 29/04 |
| 2024/0092426 A1* | 3/2024 | Park | B62D 29/043 |

* cited by examiner

*Primary Examiner* — Gregory A Blankenship
(74) *Attorney, Agent, or Firm* — Slater Matsil, LLP (57) ABSTRACT

An embodiment front vehicle body structure includes an inner cabin part, an outer cabin part, and a reinforcement part mounted between the inner cabin part and the outer cabin part. The inner cabin part, the outer cabin part and the reinforcement part each comprise a carbon fiber reinforced plastic material.

20 Claims, 10 Drawing Sheets

FRONT VEHICLE BODY STRUCTURE

CROSS-REFERENCE TO RELATED APPLICATIONS

This application claims the benefit of Korean Patent Application No. 10-2021-0179712, filed on Dec. 15, 2021, which application is hereby incorporated herein by reference.

TECHNICAL FIELD

The present invention relates to a front vehicle body structure.

BACKGROUND

Carbon fiber reinforced plastic (hereinafter CFRP) is a composite material using carbon fiber as a reinforcing material and thermosetting resin or thermoplastic resin as a matrix.

Because CFRP is relatively light and has high strength, its use is increasing in body manufacturing.

The CFRP front reinforcing member structure is a structure that surrounds the CFRP cabin, and improves the torsional strength of the vehicle body and supports a load in the event of a crash to improve crash performance.

In addition, by applying an aluminum module and subframe separation structure, it may play a role in reducing the injury of the occupant in the cabin.

However, the general CFRP reinforcing member structure has a small effect on strength improvement due to the lack of an area surrounding the cabin, and may not satisfy the forward collision regulations due to the insufficient strength of the load path and the reinforcing member during a collision.

The above information disclosed in this background section is only for enhancement of understanding of the background of the invention, and therefore it may contain information that does not form the prior art that is already known to a person of ordinary skill in the art.

SUMMARY

The present invention relates to a front vehicle body structure. Particular embodiments relate to the front vehicle body structure of the CFRP material for securing the strength and crash performance of the vehicle body.

Embodiments of the present invention provide a front vehicle body structure capable of reducing the number of parts, diversifying the load transmission path, and improving the performance of the vehicle body by securing strength.

A front vehicle body structure according to an exemplary embodiment of the present invention may include an inner cabin part of a carbon fiber reinforced plastic material, an outer cabin part of a carbon fiber reinforced plastic material, and a reinforcement part of a carbon fiber reinforced plastic material mounted between the inner cabin part and the outer cabin part.

The outer cabin part may include a dash outer panel coupled with a front module of the front vehicle body, and the inner cabin part may include a lower cross member formed in the width direction of the vehicle body. And the reinforcement portion may include a front reinforcement connected to the dash outer panel and a rear reinforcement part connected to the lower cross member.

The front reinforcement may include two front protrude reinforcements formed to combine with the front module.

The front reinforcement may further include a connection reinforcement that connects the front protrude reinforcement of both sides.

The vehicle body height direction length of the front protrude reinforcement may be smaller than the height direction length of the dash outer panel.

The front protrude reinforcement and the dash outer panel may form a cavity area between them.

The front vehicle body structure according to an exemplary embodiment of the present invention may further include a front sub-frame mounted to the outer cabin part corresponding to the cavity area.

The front reinforcement may include a front reinforcement body protruding toward the front of the vehicle body and a front reinforcement flange that is curved from the front reinforcement body and combines with the inner cabin part.

The inner cabin part may include an A pillar part formed on both sides in the vehicle body height direction, and the reinforcement portion may further include a side reinforcement part extended from the front reinforcement and connected to the A pillar part.

The inner cabin part may include a side protruding part formed along the vehicle body length direction under the A pillar part, and the side reinforcement part may include a side reinforcement part protrusion inserted inside the side protruding part.

The side reinforcement part may further include a side reinforcement part flange that is curved from the side protruding part and coupled with the A pillar part.

The rear reinforcement part may be inclined backward and downward from the front protrude reinforcement.

The rear reinforcement part may include a rear reinforcement part flange connected with the inner cabin part and a rear reinforcement part body formed to protrude from the rear reinforcement flange.

The front module, the dash outer panel and the front protrude reinforcement may be joined with a fastener.

The inner cabin part may include an inner tunnel portion formed in a vehicle body length direction, and the outer cabin part may include an outer tunnel portion that forms a tunnel together with the inner tunnel portion.

According to the front vehicle body structure according to an exemplary embodiment of the present invention, the performance of the vehicle body may be improved by reducing the entire number of parts while diversifying the load transmission path and securing strength.

In addition, the effects that can be obtained or predicted by exemplary embodiments of the present invention will be disclosed directly or implicitly in the detailed description of the exemplary embodiments of the present invention. That is, various effects predicted according to exemplary embodiments of the present invention will be disclosed within a detailed description to be described later.

BRIEF DESCRIPTION OF THE DRAWINGS

Since these drawings are for reference in explaining exemplary embodiments of the present invention, the technical idea of the present invention should not be construed as being limited to the accompanying drawings.

The following descriptors may be used in connection with the drawings to describe various embodiments of the present invention.

| | |
|---|---|
| 10: vehicle body | 12: front module |
| 14: front sub-frame | 20: inner cabin part |
| 22: lower cross member | 24: A pillar part |
| 28: side protruding part | 30: inner tunnel portion |
| 50: outer cabin part | 52: dash outer panel |
| 56: cavity area | 58: outer tunnel portion |
| 60: tunnel | 70: reinforcement portion |
| 80: front reinforcement | 82: front protrude reinforcement |
| 86: connection reinforcement | 88: front reinforcement body |
| 90: front reinforcement flange | 94: reinforcement length side |
| 96: reinforcement height side | 100: rear reinforcement part |
| 102: rear reinforcement part flange | 104: rear reinforcement part body |
| 120: side reinforcement part | |
| 124: side reinforcement part protrusion | |
| 126: side reinforcement part flange | 130: fastener |

DETAILED DESCRIPTION OF ILLUSTRATIVE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clearly explain embodiments of the present invention, parts irrelevant to the description are omitted, and the same reference numerals are assigned to the same or similar elements throughout the specification.

Since the size and thickness of each component shown in the drawings are arbitrarily indicated for convenience of description, the present invention is not necessarily limited to those shown in the drawings, and the thicknesses are enlarged to clearly express various parts and regions.

In addition, in the detailed description below, the reason that the names of the components are divided into first, second, etc. is to classify the components in the same relationship, and it is not necessarily limited to the order in the following description.

Throughout the specification, when a part includes a certain element, it means that other elements may be further included, rather than excluding other elements, unless specifically stated otherwise.

In addition, terms such as . . . part, . . . described in the specification mean a unit of a comprehensive configuration that performs at least one function or operation.

When a part, such as a layer, film, region, plate, etc., is "on" another part, this includes not only the case where it is directly above the other part, but also the case where there is another part in between.

In contrast, when an element is referred to as being "directly on" another element, there are no intervening elements present.

Exemplary embodiments of the present invention will hereinafter be described in detail with reference to the accompanying drawings.

Figure 1:
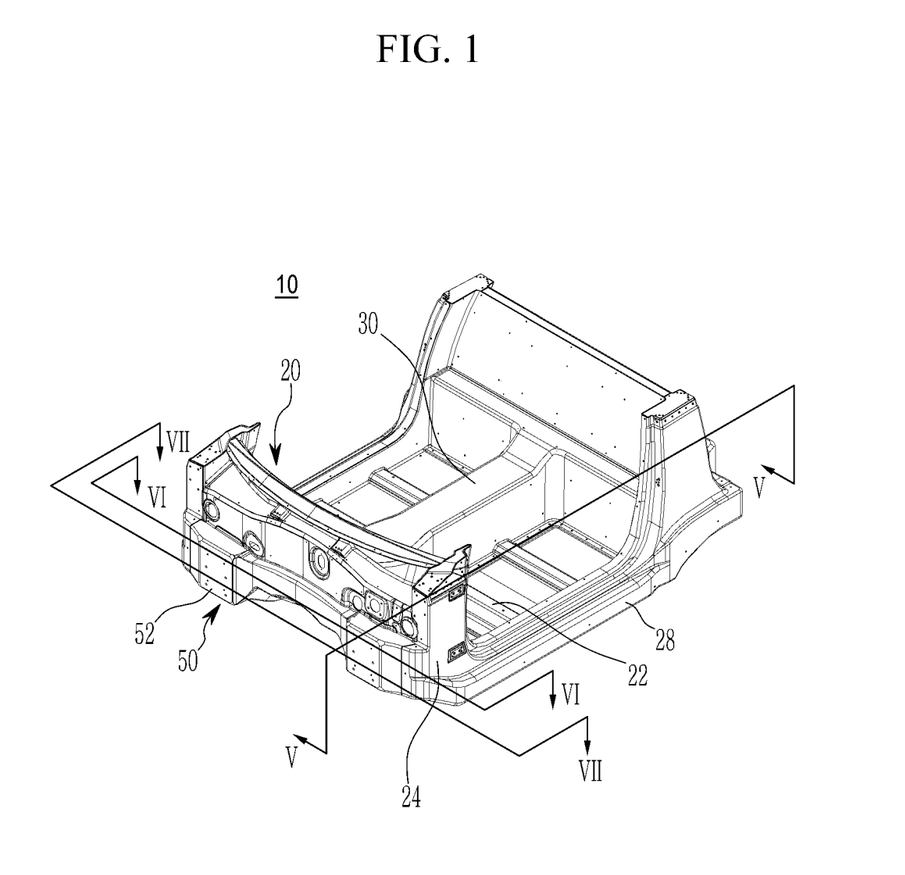
FIG. 1 is a perspective view of the front vehicle body structure according to an exemplary embodiment of the present invention.

FIG. 1 is a perspective view of the front vehicle body structure according to an exemplary embodiment of the present invention.

Referring to FIG. 1, a vehicle body 10 to which the front vehicle body structure according to an exemplary embodiment of the present invention may be applied may include an inner cabin part 20 of a carbon fiber reinforced plastic material and an outer cabin part 50 of a carbon fiber reinforced plastic material.

The carbon fiber reinforced plastic (hereinafter CFRP) is a composite material using carbon fiber as a reinforcement and a thermosetting resin or thermoplastic resin as a matrix. Since the CFRP is relatively light and has high strength, its use is increasing in vehicle body manufacturing.

Figure 2:
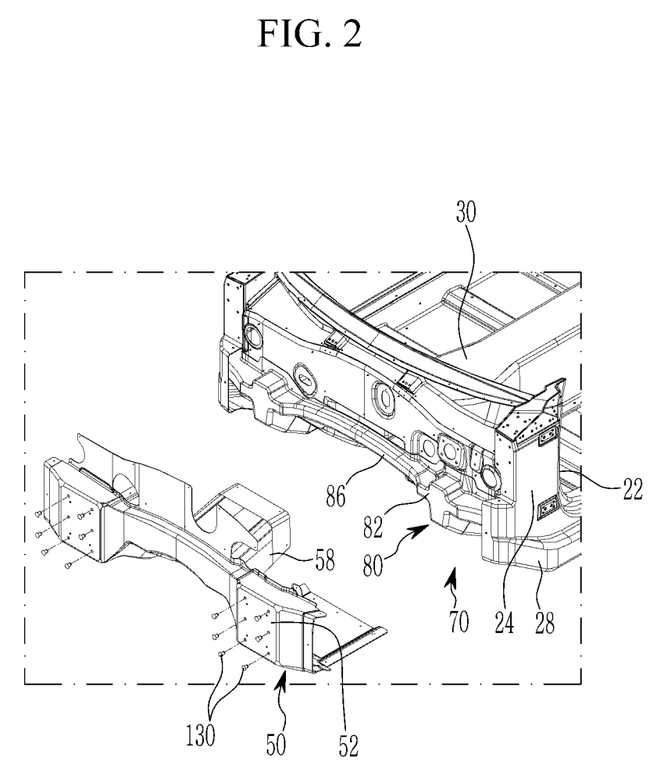
FIG. 2 is a partially exploded perspective view of the front vehicle body structure according to an exemplary embodiment of the present invention.

FIG. 2 is a partially exploded perspective view of the front vehicle body structure according to an exemplary embodiment of the present invention.

Referring to FIG. 1 and FIG. 2, the front vehicle body structure according to an exemplary embodiment of the present invention may include a reinforcement portion 70 of the CFRP material mounted between the inner cabin part 20 and the outer cabin part 50.

Figure 3:
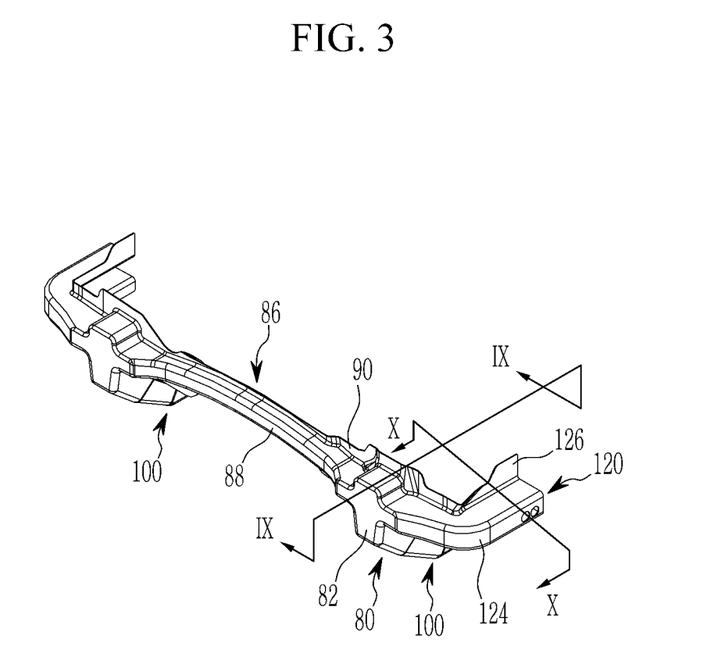
FIG. 3 and FIG. 4 are perspective views of a reinforcement that may be applied to the front vehicle body structure according to an exemplary embodiment of the present invention.
Figure 4:
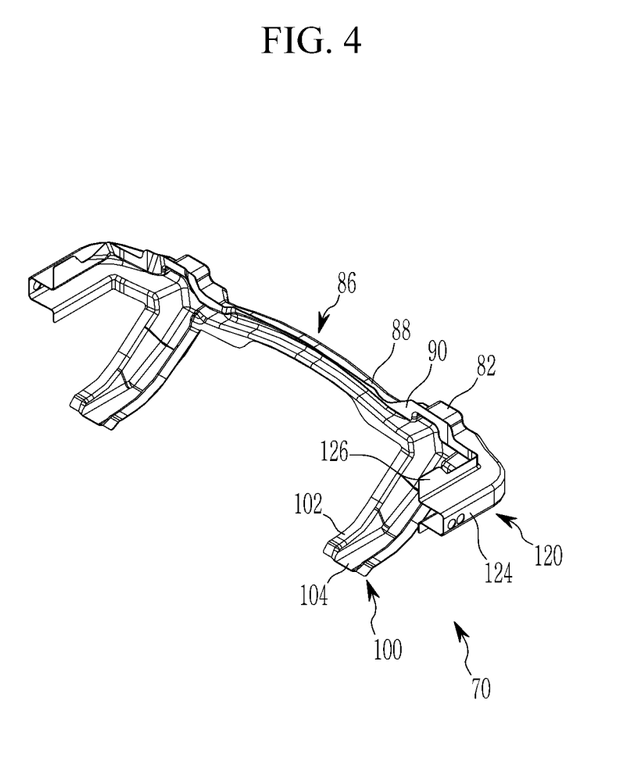

FIG. 3 and FIG. 4 are perspective views of a reinforcement that may be applied to the front vehicle body structure according to an exemplary embodiment of the present invention.

Figure 5:
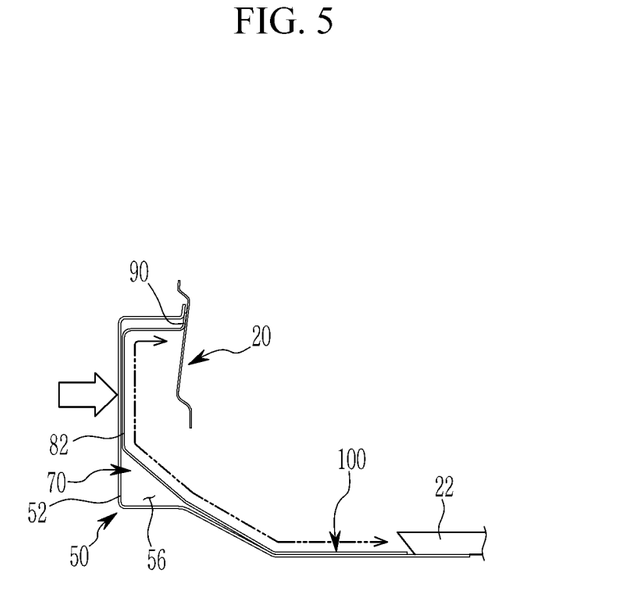
FIG. 5 is a cross-sectional view along the line V-V of FIG. 1.
Figure 6:
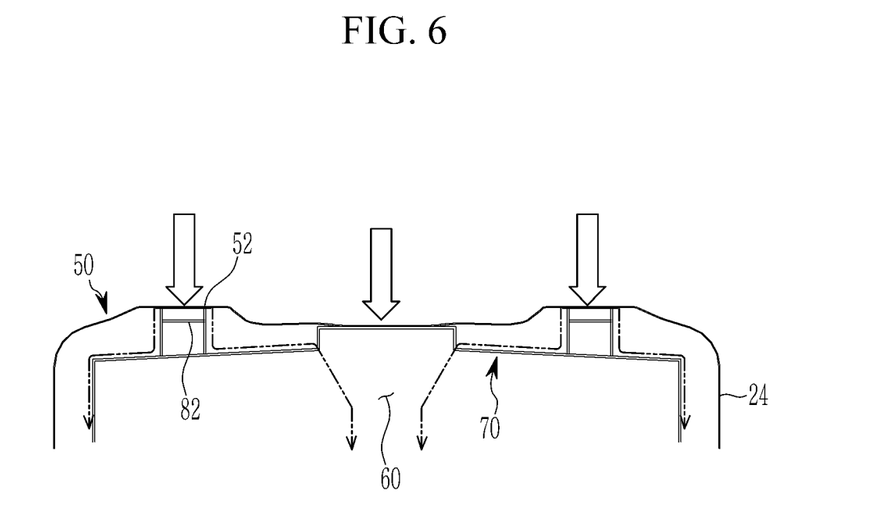
FIG. 6 is a cross-sectional view along the line VI-VI of FIG. 1.
Figure 7:
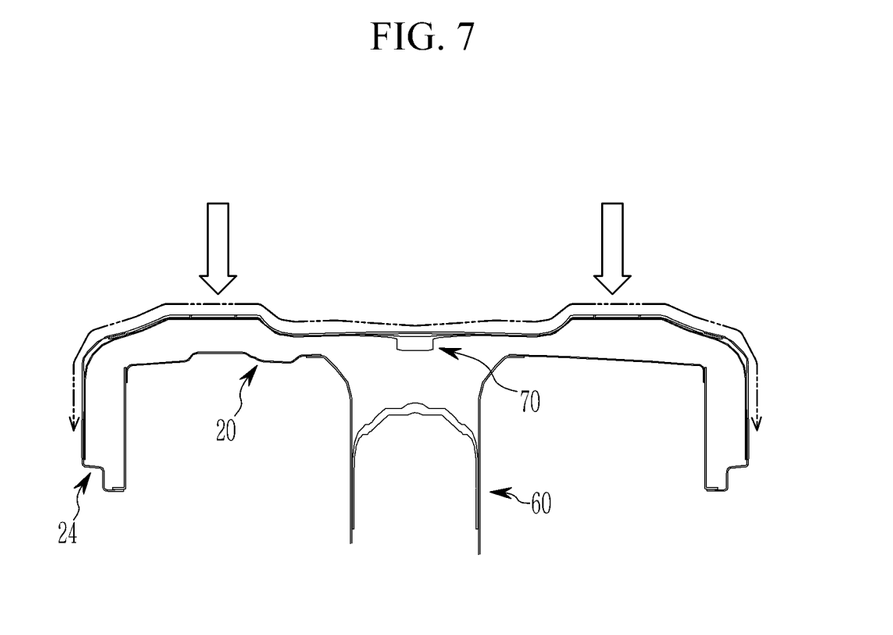
FIG. 7 is a cross-sectional view along the line VII-VII of FIG. 1.

FIG. 5 is a cross-sectional view along the line V-V of FIG. 1, FIG. 6 is a cross-sectional view along the line VI-VI of FIG. 1, and FIG. 7 is a cross-sectional view along the line VII-VII of FIG. 1.

Figure 8:
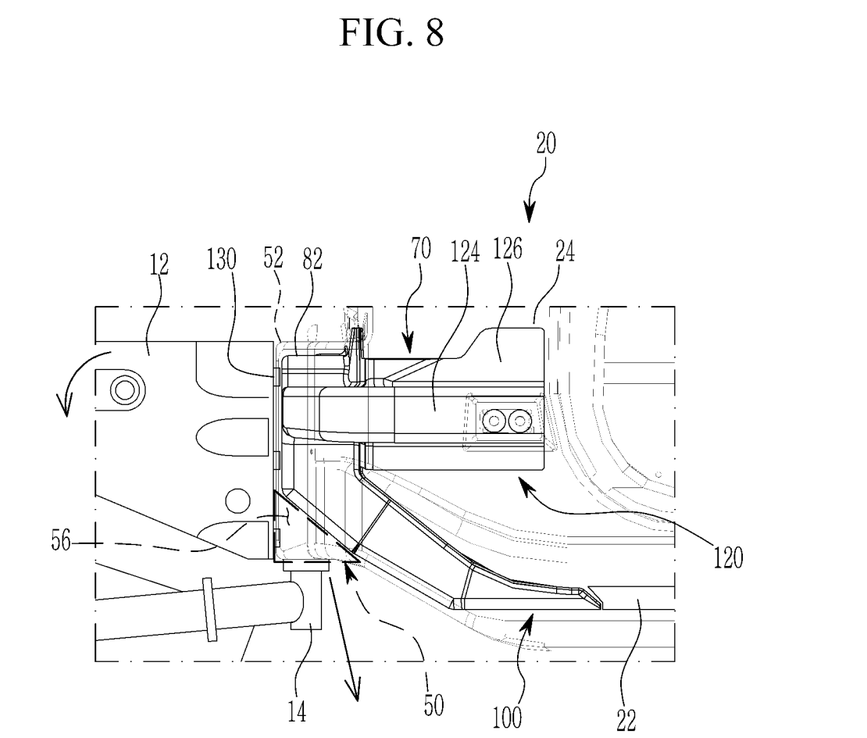
FIG. 8 is a partial side view of the front vehicle body structure according to an exemplary embodiment of the present invention.

FIG. 8 is a partial side view of the front vehicle body structure according to an exemplary embodiment of the present invention.

Referring to FIG. 1 to FIG. 8, the outer cabin part 50 includes a dash outer panel 52 coupled with a front module 12 (referring to FIG. 8) of the front vehicle body, and the inner cabin part 20 includes a lower cross member 22 formed in the width direction of the vehicle body.

The reinforcement portion 70 may include a front reinforcement 80 connected to the dash outer panel 52 and a rear reinforcement part 100 connected to the lower cross member 22.

The reinforcement portion 70 connects the dash outer panel 52 and the lower cross member 22, and transmits the impact load transmitted from the front to the rear of the vehicle body 10 through the lower cross member 22 when the vehicle body collides.

The front reinforcement 80 may include two front protrude reinforcements 82 formed to combine with the front module 12.

Referring to FIG. 1, FIG. 2, FIG. 3 and FIG. 8, the front module 12, the dash outer panel 52 and the front protrude reinforcement 82 may be joined with a fastener 130. For example, the fastener 130 may be a bolt.

The front module 12, the dash outer panel 52 and the front protrude reinforcement 82 are integrally connected through the fastener 130. Thus, when the vehicle body 10 collides, the impact load transmitted from the front module 12 may be transmitted to the rear of the vehicle body 10 through the reinforcement portion 70 and the lower cross member 22 to distribute the impact load.

The front module 12 is, for example, a module made of an aluminum material to reduce the vehicle weight, and the dash outer panel 52 and the front protrude reinforcement 82 made of the CFRP material may be physically coupled through the fastener 130.

The front reinforcement 80 may further include a connection reinforcement 86 that connects the front protrude reinforcement 82 of both sides. The connection reinforcement 86 may reinforce the strength of the vehicle body 10 by transmitting the load in the width direction of the vehicle body 10 and improve NVH performance.

Referring to FIG. 5 and FIG. 8, the vehicle body height direction length of the front protrude reinforcement 82 may be smaller than the height direction length of the dash outer panel 52.

The front protrude reinforcement 82 and the dash outer panel 52 may form a cavity area 56 between them. The cavity area 56 may be formed under the connection position of the front protrude reinforcement 82 and the dash outer panel 52.

The impact load transmitted from the front module 12 during the front collision of the vehicle body 10 may be transmitted to the rear of the vehicle body 10 through the reinforcement portion 70 and the lower cross member 22 to distribute the impact load. Also, since the cavity area 56 is formed under the dash outer panel 52, when the impact load transmitted from the front module 12 is relatively large, the lower portion of the dash outer panel 52 may be damaged first. Then, the front module 12 is deviated or rotated anticlockwise relative to the reinforcement portion 70, thereby protecting the occupant of the rear.

The front vehicle body structure according to an exemplary embodiment of the present invention may further include a front sub-frame 14 mounted to the outer cabin part 50 corresponding to the cavity area 56.

In the event of a front collision of the vehicle body 10, the lower part of the outer cabin part 50 collapses first, and the front sub-frame 14 is separated from the vehicle body 10 so as to protect the occupant.

The front reinforcement 80 may include a front reinforcement body 88 protruding toward the front of the vehicle body and a front reinforcement flange 90 that is curved from the front reinforcement body 88 and combines with the inner cabin part 20. The front reinforcement body 88 may have, for example, a "U"-shaped cross-section.

The front reinforcement body 88 may secure the strength in the length direction and width direction of the vehicle body 10 of the reinforcement portion 70 by the curved and protruded shape, and the front reinforcement flange 90 may be combined with the inner cabin part 20 to secure the connection strength of the outer cabin part 50 and the inner cabin part 20.

In addition, the reinforcement portion 70 connects the inner cabin part 20 and the lower cross member 22 through the front reinforcement flange 90 and the rear reinforcement part 100, so that NVH performance of the vehicle body 10 and collision load distribution are possible.

Referring to FIG. 1, FIG. 2, FIG. 3 and FIG. 8, the inner cabin part 20 includes an A pillar part 24 formed on both sides in the vehicle body height direction, and the reinforcement portion 70 may further include a side reinforcement part 120 extended from the front reinforcement 80 and connected to the A pillar part 24.

The side reinforcement part 120 may strengthen the side strength of the vehicle body 10, and may be connected to the A pillar part 24 to increase the connection strength with the inner cabin part 20.

Referring to FIG. 1, FIG. 2, FIG. 3, FIG. 8 and FIG. 10, the inner cabin part 20 may include a side protruding part 28 formed to protrude along the vehicle body length direction under the A pillar part 24, and the side reinforcement part 120 may include a side reinforcement part protrusion 124 inserted inside the side protruding part 28.

The side reinforcement part 120 may further include a side reinforcement part flange 126 that is curved from the side protruding part 28 and coupled with the A pillar part 24.

The side reinforcement part 120 may strengthen the side strength of the vehicle body 10, and increase the connection strength with the side protruding part 28. The side protruding part 28 may be, for example, a side sill.

Referring to FIG. 4, the rear reinforcement part 100 may be inclined backward and downward from the front protrude reinforcement 82.

The rear reinforcement part 100 may include a rear reinforcement part flange 102 connected with the inner cabin part 20 and a rear reinforcement part body 104 formed to protrude from the rear reinforcement part flange 102.

The rear reinforcement part 100 may increase the lower strength of the vehicle body 10 and distribute the collision load during vehicle collision through the inner cabin part 20 and the lower cross member 22.

Referring to FIG. 1 and FIG. 2, the inner cabin part 20 may include an inner tunnel portion 30 formed in a vehicle body length direction, and the outer cabin part 50 may include an outer tunnel portion 58 that forms a tunnel 60 together with the inner tunnel portion 30.

The tunnel 60 may mount electrical components inside therein, and by increasing the length direction strength of the vehicle body 10, the vehicle body collision may distribute the impact load and improve NVH performance.

Figure 9:
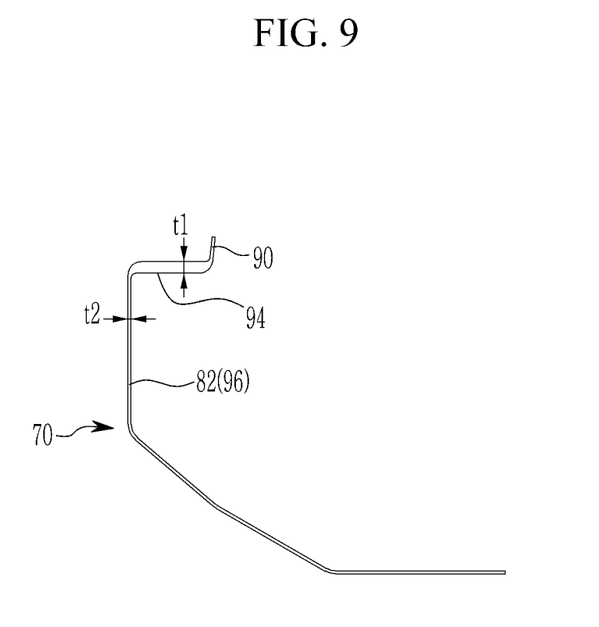
FIG. 9 is a cross-sectional view along the line IX-IX of FIG. 3.
Figure 10:
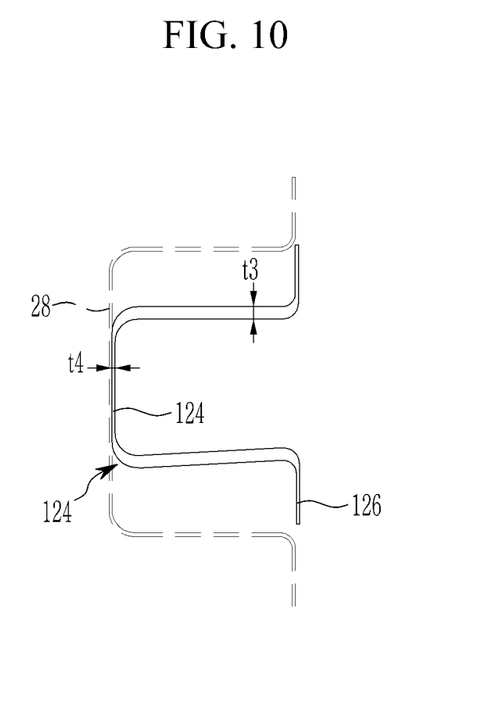
FIG. 10 is a cross-sectional view along the line X-X of FIG. 3.

Referring to FIG. 9 and FIG. 10, the reinforcement portion 70 may include a reinforcement length side 94 formed in the length direction of the vehicle body and a reinforcement height side 96 formed in the height direction of the vehicle body. And, the thickness t1 of the reinforcement length side 94 may be thicker than the thickness t2 of the reinforcement height side 96.

For example, the reinforcement length side 94 may be defined as surfaces formed along the length direction of the vehicle body 10 of the upper and lower parts of the front protrude reinforcement 82, upper and lower parts of the front reinforcement body 88, etc. The reinforcement height side 96 may be defined as surfaces of a front surface of the front protrude reinforcement 82, a surface formed along the height direction of the front reinforcement body 88, etc. Since the thickness t1 of the reinforcement length side 94 is thicker than the thickness t2 of the reinforcement height side 96, the collision load may be smoothly and effectively distributed to the rear of the vehicle body 10 in a front collision of the vehicle.

In addition, for example, the reinforcement length side 94 may be defined as the upper and lower surfaces of the side reinforcement part protrusion 124. The reinforcement height side 96 may be defined as the side surface of the side reinforcement part protrusion 124. Since the thickness t3 of the reinforcement length side 94 is formed thicker than the thickness t4 of the reinforcement height side 96, the collision load may be smoothly distributed to the rear of the vehicle body 10 in a front collision of the vehicle.

Referring to FIG. 5 to FIG. 8, the impact load transmitted from the front module 12 is transmitted to the inner cabin part 20 through the front protrude reinforcement 82 and the reinforcement portion 70. That is, the impact load may be distributed to the rear of the vehicle body 10, and the occupant may be safely protected.

In addition, the reinforcement portion 70 may increase the connection strength of the outer cabin part 50 and the inner cabin part 20, and improve NVH performance.

In addition, the cavity area 56 formed between the reinforcement portion 70 and the outer cabin part 50 may collapse upon collision of the vehicle and separate the front module 12 and the front sub-frame 14. Therefore, it is possible to protect the vehicle occupant by preventing the front module 12 and the front sub-frame 14 from penetrating into the vehicle cabin.

As shown in FIG. 5 to FIG. 7, the impact load transmitted from the front module 12 is transmitted through the reinforcement portion 70 to the lower cross member 22, the tunnel 60, the A pillar part 24 and the side protruding part 28 so that it is possible to protect the passenger.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A front vehicle body structure comprising:
   an inner cabin part that comprises a lower cross member formed in a width direction of the front vehicle body structure;
   an outer cabin part that comprises a dash outer panel coupled with a front module of the front vehicle body structure; and
   a reinforcement part mounted between the inner cabin part and the outer cabin part, wherein the inner cabin part, the outer cabin part, and the reinforcement part each comprise a carbon fiber reinforced plastic material wherein the reinforcement part comprises:
      a rear reinforcement part connected to the lower cross member; and
      a front reinforcement connected to the dash outer panel, the front reinforcement comprising two front protrude reinforcements that protrude to combine with the front module.

2. The front vehicle body structure of claim 1, wherein:
   the inner cabin part comprises an inner tunnel portion formed in a vehicle body length direction; and
   the outer cabin part comprises an outer tunnel portion that defines a tunnel together with the inner tunnel portion.

3. The front vehicle body structure of claim 1, wherein the reinforcement part comprises:
   a reinforcement length side formed in a length direction of the front vehicle body; and
   a reinforcement height side formed in a height direction of the front vehicle body, wherein a thickness of the reinforcement length side is thicker than a thickness of the reinforcement height side.

4. The front vehicle body structure of claim 1, wherein the front reinforcement comprises a connection reinforcement that connects the two front protrude reinforcements.

5. The front vehicle body structure of claim 4, wherein the front reinforcement comprises:
   a front reinforcement body protruding toward a front of the front vehicle body structure; and
   a front reinforcement flange that is curved from the front reinforcement body and combines with the inner cabin part.

6. The front vehicle body structure of claim 1, wherein a height direction length of the front protrude reinforcement is smaller than the height direction length of the dash outer panel.

7. The front vehicle body structure of claim 1, wherein the front protrude reinforcements and the dash outer panel define a cavity area between them.

8. The front vehicle body structure of claim 7, further comprising a front sub-frame mounted to the outer cabin part corresponding to the cavity area.

9. The front vehicle body structure of claim 1, wherein the front module, the dash outer panel and the front protrude reinforcement are joined with a fastener.

10. The front vehicle body structure of claim 1, wherein the rear reinforcement part is inclined backward and downward from the front protrude reinforcement.

11. The front vehicle body structure of claim 10, wherein the rear reinforcement part comprises:
    a rear reinforcement part flange connected with the inner cabin part; and
    a rear reinforcement part body protruding from the rear reinforcement part flange.

12. A front vehicle body structure comprising:
    a front module;
    an inner cabin part comprising a lower cross member formed in a width direction of the front vehicle body structure and an A pillar part formed on both sides in a vehicle body height direction;
    an outer cabin part comprising a dash outer panel coupled with the front module; and
    a reinforcement part mounted between the inner cabin part and the outer cabin part, the reinforcement part comprising a front reinforcement connected to the dash outer panel, a rear reinforcement part connected to the lower cross member, and a side reinforcement part extended from the front reinforcement and connected to the A pillar part;
    wherein each of the inner cabin part, the outer cabin part, and the reinforcement part comprises a carbon fiber reinforced material;
    wherein the inner cabin part comprises a side protruding part protruding along a vehicle body length direction under the A pillar part; and
    wherein the side reinforcement part comprises a side reinforcement part protrusion inserted inside the side protruding part.

13. The front vehicle body structure of claim 12, wherein the side reinforcement part further comprises a side reinforcement part flange that is curved from the side protruding part and coupled with the A pillar part.

14. A vehicle comprising:
    a vehicle body comprising a front module;
    an inner cabin part comprising a lower cross member formed in a width direction of the vehicle;
    an outer cabin part comprising a dash outer panel coupled with the front module;
    a reinforcement part mounted between the inner cabin part and the outer cabin part, the reinforcement part comprising:
       a front reinforcement connected to the dash outer panel and comprising two front protrude reinforcements that protrude to combine with the front module; and a rear reinforcement part connected to the lower cross member; and a front sub-frame mounted to the outer cabin part; and wherein each of the inner cabin part, the outer cabin part, and the reinforcement part comprises a carbon fiber reinforced material.

15. The vehicle of claim 14, wherein the front reinforcement comprises a connection reinforcement that connects the two front protrude reinforcements.

16. The vehicle of claim 15, wherein the front reinforcement comprises:

a front reinforcement body protruding toward a front of the vehicle; and a front reinforcement flange that is curved from the front reinforcement body and combines with the inner cabin part.

17. The vehicle of claim 16, wherein the front protrude reinforcement and the dash outer panel define a cavity area between them.

18. The vehicle of claim 17, wherein the front sub-frame is mounted to the outer cabin part corresponding to the cavity area.

19. The vehicle of claim 14, wherein the front module, the dash outer panel and the front protrude reinforcement are joined with a fastener.

20. The vehicle of claim 14, wherein the rear reinforcement part is inclined backward and downward from the front protrude reinforcement.

* * * * *